Patented Apr. 17, 1945

2,374,064

UNITED STATES PATENT OFFICE 2,374,064

AZO PIGMENTS

Harold E. Woodward, Penns Grove, N. J., assignor to E. I. du Pont de Nemours & Company, Wilmington, Del., a corporation of Delaware No Drawing. Application April 21, 1943,
Serial No. 483,939

4 Claims. (Cl. 260—193)

This invention relates to new monazo yellow pigments of the so-called Hansa Yellow type.

The term "Hansa Yellow" was originally a trade name but certain colors are now generally called Hansa Yellows in the pigment and ink trade. They are generally monazo yellow pigments in which a diazo component, frequently of the aniline series, is coupled to an acetoacet anilide. See Journal of the Society of Dyers and Colourists, page 80, vol. 42, page 205, vol. 44. An example of the Hansa Yellow pigments is Hansa Yellow G, which is meta-nitro-para-toluidine coupled to acetoacet anilide, which was first disclosed in U. S. P. 1,082,719; another example is Hansa Yellow 10–G, which is 2-nitro-4-chlor-aniline coupled to acetoacetyl-ortho-chlor-aniline, which was disclosed in U. S. P. 1,059,599. The Hansa Yellows are good pigments. In U. S. P. 2,112,764 there is disclosed an invention covering a great many azo colors. Among the coupling components recited in that patent is 2-methyl-3-chlor-acetoacet-anilide, but none of the diazo intermediates disclosed in that patent will produce the results which have been attained by the present invention.

There is a demand in the trade for yellow pigments of the azo type which have a greenish hue. Heretofore as the shade of the pigment shifted toward green, there was an accompanying decrease in certain qualities of strength and fastness. An object of this invention is to produce yellow pigments of greenish hue which are superior in those properties to older pigments of similar greenish shade and which are equal in those characteristics to the redder pigments.

The objects of this invention have been accomplished in particular by diazotizing 2-nitro-4-chlor-aniline and coupling it to 2-methyl-3-chlor-acetoacet-anilide, which produces a pigment having astonishing strength. With the discovery of this pigment there was also discovered a class of pigments having the same coupling component and having an azo component of the 2-nitro-aniline class, which may carry in positions other than 1 and 2 halogen, alkyl, alkoxy, or hydrogen. No particular advantage is secured by using more than one of the substituents halogen, alkyl, and alkoxy, although they may be used to produce particular shades or to affect particular characteristics. Chlorine is the preferred halogen substituent but bromine may be used. This class as a whole has the advantage of being produced in green shades without loss of strength, and the particular member produced by the combination of the coupling component with 2-nitro-4-chlor-aniline is unique. In this class it is preferred that the substituent should be para to the nitro or to the amino group.

The following examples are given as illustrations; they are not limitations.

Example I

A filtered solution of the diazonium chloride was prepared from 172 parts of 2-nitro-4-chlor aniline by diazotization with 2.5-equivalents of hydrochloric acid and 1 equivalent of sodium nitrate. 226 parts of 2-methyl-3-chlor-acetoacet anilide were suspended at 60° C. in 2500 parts of water containing 44 parts of sodium hydroxide, 272 parts of sodium acetate crystals were added and the whole was made slightly acid to litmus by the addition of hydrochloric acid. The diazonium chloride was added to this suspension at room temperature, little by little, about an hour being taken for the addition. A pigment was obtained which was slightly redder than the pigment of Example II hereof. The pigment was filtered at 90° and dried. It was ground in lithographic varnish to produce an ink which was approximately equal in hue to inks identically made from commercial standards of Hansa Yellow 10–G, but which was twice as strong in tinting strength. In light fastness the new pigment was equal to Hansa Yellow 10–G even in tints containing half as much pigment. When ground in cellulose nitrate lacquer and sprayed on sheet metal, it produced a yellow coating which showed very little bleeding into white paint, being superior in this respect to prior art Hansa Yellows which are in commercial production. The formula of this pigment is:

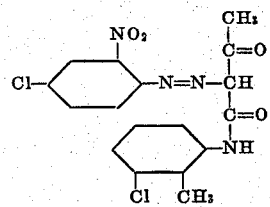

Example II

A filtered solution of the diazonium chloride prepared from 138 parts of ortho-nitro-aniline with 2.5-equivalents of hydrochloric acid and 1 equivalent of sodium nitrite was added during one hour at room temperature to a suspension prepared by dissolving 226 parts of 2-methyl-3-chlor-acetoacet anilide in 2500 parts of water at 60° with 44 parts sodium hydroxide, adding 272 parts of sodium acetate crystals and making slightly acid to litmus with about 40 parts of hydrochloric acid. The yellow pigment was filtered at 90° and dried. This pigment was ground in lithographic varnish to produce an ink which was greener in masstone and tint than the corresponding color from acetoacet anilide (Hansa Yellow 5-G). It was also greener than Hansa Yellow 10-G which is the greenest of the Hansa Yellows on the market. Its fastness properties were good. It is represented by the formula:

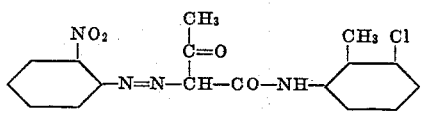

Example III

A pigment was made in the same way but using 186 parts of 2-chlor-4-amino-5-nitro-toluene. This yellow pigment gave a greener ink than the corresponding pigment from acetoacet anilide, and its fastness properties were equally good.

Example IV

When 172 parts of 2-nitro-5-chlor-aniline was used as the diazo component in Example I, a greenish yellow pigment was obtained. It was slightly greener than the isomeric pigment of Example I and equally good in fastness properties.

When alkoxy is used as a substituent, it has been noted that the members of that class having more than two carbon atoms show increased solubility in oil.

The weakness of the Hansa Yellows in greener shades has kept them from becoming popular in printing inks and paints. This invention overcomes that weakness and presents a line of pigments which can be put to that use with more satisfactory results. Another advantage of this invention is that it makes available for commercial use an intermediate 2-nitro-6-chlor toluene which is a by-product of the manufacture of 2-nitro-4-chlor toluene and which had heretofore been discarded. Heretofore no known derivatives of this intermediate could compete commercially. This intermediate is used in the present invention to produce the 2-methyl-3-chlor-acetoacet anilide which constitutes the coupling component of this invention. This invention, consequently, is excellent from the standpoint of economical conservation.

As many apparently widely different embodiments of this invention may be made without departing from the spirit and scope thereof, it is to be understood that I do not limit myself to the specific embodiments thereof except as defined in the appended claims.

I claim:
1. The compounds represented by the formula:

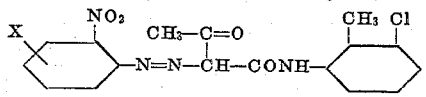

in which X is one of the group consisting of halogen, alkyl, alkoxy and hydrogen.

2. The compounds of claim 1 in which X is in position 4.

3. The compounds of claim 1 in which X is chlorine.

4. The pigment represented by the formula:

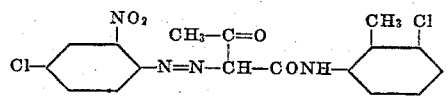

HAROLD E. WOODWARD.